(12) United States Patent
Bocaccio et al.

(10) Patent No.: US 8,555,506 B2
(45) Date of Patent: Oct. 15, 2013

(54) METHOD OF MANUFACTURING A PAINTED PLASTICS MATERIAL PART FOR THE AUTOMOBILE INDUSTRY, THE PART INCLUDING AN ORIFICE WITH A ROUNDED EDGE, AND A PART OBTAINED THEREBY

(75) Inventors: Bernard Bocaccio, Bressolles (FR); Jerome Brizin, Oyonnax (FR); Marc Verwaerde, Moras (FR); Francois Virelizier, Bourgoin Jallieu (FR)

(73) Assignee: Compagnie Plastic Omnium, Lyons (FR)

( * ) Notice: Subject to any disclaimer, the term of this patent is extended or adjusted under 35 U.S.C. 154(b) by 637 days.

(21) Appl. No.: 11/255,704

(22) Filed: Oct. 21, 2005

(65) Prior Publication Data

US 2006/0130624 A1 Jun. 22, 2006

(30) Foreign Application Priority Data

Oct. 21, 2004 (FR) .................................. 04 11226

(51) Int. Cl.
*B21D 53/88* (2006.01)
*B26F 1/02* (2006.01)
*B26D 3/02* (2006.01)

(52) U.S. Cl.
USPC .................. 29/897.2; 29/557; 83/30; 83/682; 83/869; 264/155

(58) Field of Classification Search
USPC ......... 29/897.2, 34 R, 557; 72/185, 325–327, 72/332–333, 340, 342.4, 342.5; 83/14, 30, 83/869, 667, 669, 682, 684; 264/138, 264/154–156, 153, 293, 294, 296, 642
See application file for complete search history.

(56) References Cited

U.S. PATENT DOCUMENTS

| | | | | |
|---|---|---|---|---|
| 2,972,779 A * | 2/1961 | Cowley | | 216/53 |
| 3,532,785 A * | 10/1970 | Brushaber et al. | | 264/155 |
| 3,848,043 A * | 11/1974 | Garrick et al. | | 264/134 |
| 4,158,692 A * | 6/1979 | Nilsson | | 264/320 |
| 4,243,456 A * | 1/1981 | Cesano | | 156/214 |
| 4,248,075 A * | 2/1981 | Whitley | | 72/335 |
| 4,580,932 A * | 4/1986 | Depperman | | 408/81 |
| 5,843,492 A * | 12/1998 | McCorry | | 425/397 |
| 5,887,520 A * | 3/1999 | Kinoshita | | 101/128.4 |
| 6,403,015 B1 * | 6/2002 | Oyama | | 264/553 |
| 6,432,543 B2 * | 8/2002 | Harrison et al. | | 428/423.1 |
| 6,827,895 B1 * | 12/2004 | Yamamoto | | 264/266 |
| 6,939,597 B2 * | 9/2005 | Winget et al. | | 428/142 |

(Continued)

FOREIGN PATENT DOCUMENTS

DE 101 44 136 A1 4/2003
DE 102 39 452 A1 3/2004

(Continued)

*Primary Examiner* — Alexander P Taousakis
(74) *Attorney, Agent, or Firm* — Epstein Drangel LLP; Robert L. Epstein

(57) ABSTRACT

A method of manufacturing a painted part of plastic material for the automobile industry having an opening, including the steps of molding the part and then, in the following order: painting the part; after painting, punching the part without edge-rounding using a punch to obtain the orifice; and after punching and extracting the punch from the orifice, rounding the edge of the opening of the orifice to have a predetermined radius of curvature in a radial section across the edge.

11 Claims, 2 Drawing Sheets

(56) References Cited

U.S. PATENT DOCUMENTS

| | | | |
|---|---|---|---|
| 7,101,505 B2 * | 9/2006 | Winget et al. | 264/513 |
| 7,217,387 B2 * | 5/2007 | Evans | 264/510 |
| 2004/0164450 A1 * | 8/2004 | Mathew et al. | 264/255 |
| 2010/0295329 A1 * | 11/2010 | Sapak et al. | 296/1.08 |
| 2010/0324535 A1 * | 12/2010 | Triel | 604/523 |

FOREIGN PATENT DOCUMENTS

| | | |
|---|---|---|
| DE | 102 39 453 A1 | 3/2004 |
| EP | 0323 213 A | 7/1989 |
| EP | 1 486 794 A | 10/2004 |
| JP | 54 104092 | 8/1979 |
| JP | 56 165531 A | 12/1981 |

\* cited by examiner

METHOD OF MANUFACTURING A PAINTED PLASTICS MATERIAL PART FOR THE AUTOMOBILE INDUSTRY, THE PART INCLUDING AN ORIFICE WITH A ROUNDED EDGE, AND A PART OBTAINED THEREBY

The present invention relates to a method of manufacturing a painted part made of plastics material for the automobile industry, the part including an orifice having a rounded edge, and the invention also relates to a part obtained thereby.

At present, when a painted plastics material part is to include an orifice with a rounded edge, i.e. an opening with an edge that is not sharp, but that is rounded with a predetermined radius of curvature, the orifice is made by punching and simultaneously the edge of the orifice is rounded using a shape that is integrated in the punch. Performing these two operations simultaneously is considered as saving time since it reduces the number of manipulations performed on the part, with respect to the punching and rounding operations.

In spite of the apparent time saving as mentioned above, the inventors of the present invention have found that overall the fact of rounding the edge of an orifice at the same time as punching the orifice is not without its disadvantages.

Firstly, the edge-rounding operation, which is difficult since it requires material to creep, does not occur under good conditions because of the presence of the punch in the orifice while the edge-rounding tool is deforming the opening of the orifice. This spoils the quality of the edge rounding, such that a punching-and-rounding operation is not performed on parts that have already been painted, since the paint is degraded too much by the rounding operation.

As a result, orifices are always made prior to painting, which requires an intermediate stock of unpainted parts to be held in order to be able to satisfy vehicle orders as a function of the options that have been requested, which options often determine whether or not a rounded-edge orifice is required in a part. This applies in particular to ultrasound sensors for providing assistance in parking.

Furthermore, painting the parts after the orifice has been made requires the orifice to be masked prior to painting in order to prevent a fog of paint passing through the orifice and becoming deposited on the inside face of the part, since that would interfere with fastening a member that is to occupy the orifice, e.g. by adhesive or heat-sealing. As mentioned above, one example of such a member is an ultrasound sensor for providing assistance in parking, as can optionally be fitted to certain bumper skins.

Furthermore, it is found that punching-and-rounding sometimes leaves threads of material close to the orifice, and such threads must be removed prior to painting since otherwise they are likely to become fixed under the layer of paint.

Finally, it is also found that painting a part that has an orifice leads to an "edge effect" around the orifice. This edge effect, which is well known, is manifested by paint accumulating at the periphery of the orifice, as can be seen in grazing light, which spoils the appearance of the part.

There are thus good reasons for not punching-and-rounding parts prior to painting them, contrary to the widespread idea whereby performing these operations simultaneously leads to a saving in time.

An object of the invention is to remedy those drawbacks by providing a method of manufacturing a painted part made of plastics material for the automobile industry, the part including an orifice with an opening having a rounded edge, the method consisting in molding the part and then subjecting it to the operations of punching, edge rounding, and painting in a predetermined order, the method being characterized in that the predetermined order is as follows:

a) painting;
b) punching without edge-rounding using a punch to obtain the orifice; and
c) rounding the edge of the opening of the orifice after extracting the punch from the orifice.

The inventors have observed that the fact of rounding the edge without a punch enables the material to creep better, to such an extent that even the paint can withstand the edge-rounding operation without becoming cracked or marked. The invention thus makes it possible to punch and round the edges of parts that are already painted.

This avoids all of the problems outlined above associated with the need to perform painting after punching.

A method of the invention may further comprise one or more of the following characteristics:

the opening of the orifice has its edge rounded to a radius of at least 0.9 millimeters (mm);
punching is performed at a given temperature appropriate for punching, and then edge-rounding is performed at another given temperature, appropriate for edge-rounding; and
punching is performed at a given speed, appropriate for punching, and then edge-rounding is performed at another given speed, appropriate for edge-rounding.

The invention also provides a painted part made of plastics material for the automobile industry, the part including an orifice with an opening having an edge rounded to a radius of at least 0.9 mm.

Preferably, the part constitutes a bumper skin.

In an implementation of the invention, the orifice is provided to receive an ultrasound sensor for providing assistance in parking.

The invention can be better understood on reading the following description given purely by way of example and made with reference to the accompanying drawings, in which:

FIGS. 1 to 4 show a plastics material part 3 for the automobile industry during the successive steps of a method of manufacturing said part 3.

Figure 1:
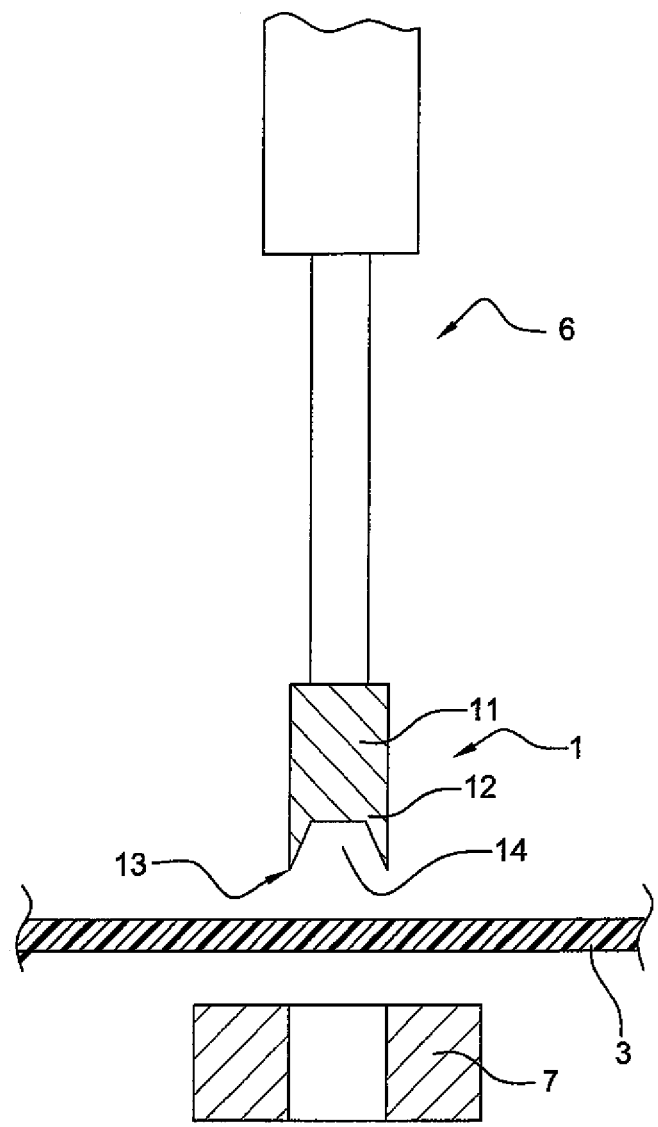
FIG. 1 is a section view of a plastics material part immediately before being punched, the part being between a punch carried by an actuator and a die.

During a preliminary step, the part 3 is molded, e.g. to constitute a bumper skin.

The part 3 is then subjected to operations for making an orifice 4 having an opening 5 in said part 3 with the edge of the opening being rounded. For example, the orifice 4 is for receiving an ultrasound sensor for providing assistance in parking.

The first operation is an operation of painting the part 3 using conventional means.

The second operation is a punching operation in which the part 3 is punched to obtain the orifice 4, but without rounding the edge thereof.

This punching operation is performed using a punch 1 mounted on an actuator 6. The punch 1 has a punch head 11 comprising a body 12 with a sharp end 13. The sharp end 13 includes a recess 14 for enabling material to be evacuated during punching.

Figure 2:
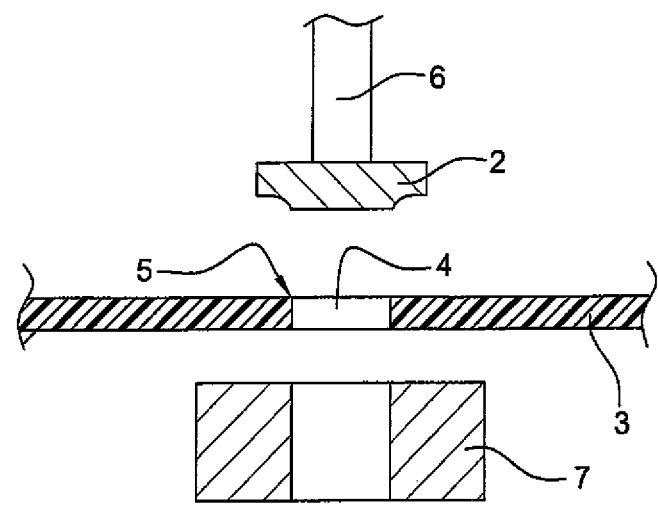
FIG. 2 is a section view showing the FIG. 1 part after it has been punched and immediately before the edge of its orifice is rounded, the part being shown between an edge-rounding tool and the die.

Once the orifice 4 has been made in the painted part 3, the punch 1 is removed from the orifice 4. At this stage of the method, the opening 5 has a sharp edge, as can be seen in FIG. 2.

Figure 3:
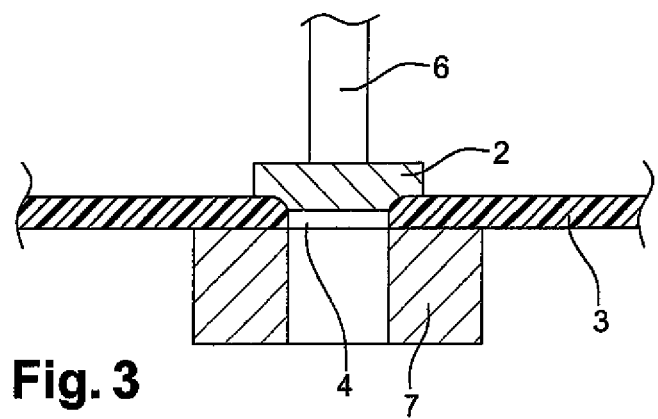
FIG. 3 is a view analogous to FIG. 2, showing the edge-rounding operation taking place.
Figure 4:
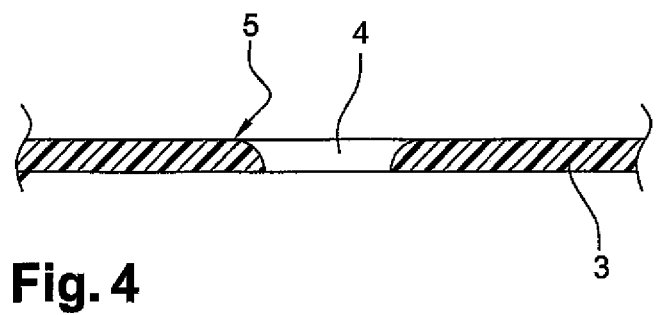
FIG. 4 is a section view of the part after the edge of the orifice has been rounded.

The method then moves onto a third operation which is an operation of rounding the edge of the opening 5 of the orifice 4 after the punch 1 has released the orifice, as shown in FIG. 3.

This operation is performed using an edge-rounding tool 2 mounted on the actuator 6 instead of the punch 1, together with an edge-rounding die 7 of conventional type.

It should be observed that the optimum speed of rotation for the punch 1 and the optimum temperature appropriate for edge-rounding are generally different from the optimum speed of rotation for the punch 1 and the optimum temperature appropriate for punching.

By means of the method of the invention, the punching and edge-rounding operations are not performed simultaneously, thus making it possible for the speed of rotation of the punch 1 and temperature to be different between the operations, so as to enable each of the operations to be optimized.

Thus, punching is performed at a given temperature that is suitable for punching, and then edge-rounding is performed at another given temperature that is suitable for edge-rounding, and punching is performed at a given speed that is suitable for punching, and then edge-rounding is performed at another given speed that is suitable for edge-rounding.

Furthermore, since the orifice 4 does not contain the punch 1 during the edge-rounding operation, material can creep into the inside of the orifice 4 under the edge-rounding tool 2. Such creep is advantageous since it does not deteriorate the painting of the part 3.

The opening 5 with its edge rounded in this way is shown in FIG. 5.

Preferably, the opening 5 of the orifice 4 is rounded to have a radius of at least 0.9 mm.

It may be observed that the invention is not limited to the embodiment described above.

Punching can be implemented against a dolly block or using any other known method other than on a die.

The invention claimed is:

1. A method of manufacturing a painted part of plastic material for the automobile industry, the part including an orifice having an opening with a rounded edge presenting a predetermined radius of curvature when the orifice is seen in a radial section, the method consisting of molding the part, and then in subjecting it to the operations of punching, edge-rounding and painting in a predetermined order, the method being characterized in that predetermined order is as follows:
   a) first, painting;
   b) after painting, punching without edge-rounding using a punch to obtain the orifice; and
   c) after punching, rounding the edge of the opening of the orifice after extracting the punch from the orifice, the edge of the opening having a predetermined radius of curvature in a radial section across the edge.

2. A method according to claim 1, in which the opening of the orifice has its edge rounded to a radius of at least 0.9 mm.

3. A method according to claim 1 or claim 2, in which punching is performed at a given temperature appropriate for punching, and then edge-rounding is performed at another given temperature, appropriate for edge-rounding.

4. A method according to anyone of claims 1-3, in which punching is performed at a given speed, appropriate for punching, and then edge-rounding is performed at another given speed, appropriate for edge-rounding.

5. A method according to claim 1, wherein material from the part creeps into the orifice during the rounding operation.

6. A method of manufacturing a painted plastic part, the method being performed in the indicated order, the method comprising:
   first, painting the part after molding the part;
   after painting, punching an orifice into the part without edge-rounding using a punch; and
   after punching, rounding an edge of the orifice after extracting the punch from the orifice, the edge having a predetermined radius of curvature in a radial section traversing the edge.

7. A method according to claim 6, wherein the predetermined radius of the edge of the orifice is at least 0.9 mm.

8. A method according to claim 6, wherein punching is performed at a given temperature appropriate for punching, and then edge-rounding is performed at another given temperature, appropriate for edge-rounding.

9. A method according to claim 6, wherein punching at a given speed, appropriate for punching and then edge-rounding is performed at another given speed, appropriate for edge-rounding.

10. A method according to claim 6, wherein material from the part creeps into the orifice during the rounding operation.

11. A method according to claim 6, wherein the part is used in manufacturing an automobile.

\* \* \* \* \*